United States Patent
Karame et al.

(10) Patent No.: US 9,710,674 B2
(45) Date of Patent: Jul. 18, 2017

(54) METHOD AND SYSTEM FOR EXECUTING APPLICATIONS IN AN UNTRUSTED ENVIRONMENT

(71) Applicant: NEC Europe Ltd., Heidelberg (DE)

(72) Inventors: Ghassan Karame, Heidelberg (DE); Joao Girao, Ludwigshafen (DE); Wenting Li, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 23 days.

(21) Appl. No.: 14/440,601

(22) PCT Filed: Nov. 6, 2013

(86) PCT No.: PCT/EP2013/073106
§ 371 (c)(1),
(2) Date: May 5, 2015

(87) PCT Pub. No.: WO2014/072312
PCT Pub. Date: May 15, 2014

(65) Prior Publication Data
US 2015/0254468 A1 Sep. 10, 2015

(30) Foreign Application Priority Data
Nov. 6, 2012 (EP) .................................. 12191400

(51) Int. Cl.
*G06F 21/62* (2013.01)
*G06F 21/12* (2013.01)
(Continued)

(52) U.S. Cl.
CPC ............ *G06F 21/629* (2013.01); *G06F 9/541* (2013.01); *G06F 21/123* (2013.01); *G06F 21/14* (2013.01); *G06F 21/602* (2013.01)

(58) Field of Classification Search
CPC ..... H04L 65/40; H04L 63/145; H04L 9/3234; H04L 29/06; H04L 9/08; H04L 9/34;
(Continued)

(56) References Cited

U.S. PATENT DOCUMENTS 5,961,639 A * 10/1999 Mallick ................. G06F 9/3822
712/209
6,510,497 B1 * 1/2003 Strongin ............. G06F 13/1626
710/309
(Continued)

FOREIGN PATENT DOCUMENTS

EP 2485173 A1 8/2012

OTHER PUBLICATIONS

Smith Thaka: "Sofrtware Watermarking Via Assembly Code Transformations", May 31, 2004, pp. 1-69, XP055102575.
(Continued)

*Primary Examiner* — Thanhnga B Truong
(74) *Attorney, Agent, or Firm* — Leydig, Voit & Mayer, Ltd.

(57) ABSTRACT

A method for executing applications on an untrusted device includes selecting one or more applications as sensitive applications. One or more instruction sequences of the said one or more sensitive applications are modified by an external dongle. The one or more sensitive applications are executed on the untrusted device according to the modified instruction sequences. Whether correct execution of the instructions of the said modified instruction sequences has occurred is checked by the external dongle.

18 Claims, 3 Drawing Sheets

(51) Int. Cl.
*G06F 21/14* (2013.01)
*G06F 9/54* (2006.01)
*G06F 21/60* (2013.01)

(58) Field of Classification Search
CPC ... H04L 9/002; H04L 2209/16; G06F 21/577;
G06F 12/14; G06F 21/57; G06F 21/00;
G06F 21/34; G06F 21/44; G06F 9/44;
G06F 7/04; G06F 21/62; G06F 9/44505;
G06F 21/123; G06F 21/14; G06F 21/629;
G06F 21/602; G06F 9/541; G06F 21/125;
H04W 12/12; H04W 12/10
USPC .......... 713/165, 166, 168, 189; 726/4, 7, 23,
726/26, 27; 709/212, 217, 224; 717/106,
717/111, 120
See application file for complete search history.

(56) References Cited

U.S. PATENT DOCUMENTS

| | | | |
|---|---|---|---|
| 8,510,369 B1* | 8/2013 | Ekke | G06F 9/45558 709/201 |
| 8,627,414 B1* | 1/2014 | McCune | H04L 9/3234 709/212 |
| 2007/0039048 A1 | 2/2007 | Shelest et al. | |
| 2012/0159193 A1 | 6/2012 | Spradlin | |

OTHER PUBLICATIONS

Kazuhide Fukushima et al: "Software Protection Combined with Tamper-Proof Device", IEICE Transactions on Fundamentals of Electronics, Communications and Computer Sciences, Engineering Sciences Society, Tokyo, JP, vol. E95A, No. 1, Jan. 1, 2012, pp. 213-222, XP001572856.

* cited by examiner

METHOD AND SYSTEM FOR EXECUTING APPLICATIONS IN AN UNTRUSTED ENVIRONMENT

CROSS-REFERENCE TO PRIOR APPLICATIONS

This application is a U.S. National Phase application under 35 U.S.C. §371 of International Application No. PCTEP2013073106, filed on Nov. 6, 2013, and claims benefit to European Patent Application No. EP 12191400.6, filed on Nov. 6, 2012. The International Application was published in English on May 15, 2014 as WO 2014/072312 under PCT Article 21(2).

FIELD

The present invention relates to a method for executing applications on an untrusted device.

Although applicable in general to any untrusted environment, the present invention will be described with regard to untrusted devices.

BACKGROUND

More and more companies tolerate the use of "foreign devices" of employees so that employees can choose their own personal devices. For instance, one intention is a reduction in costs for the company. Another intention is simply to allow employees to choose hardware according to their personal wishes. However, this so-called realm Bring Your Own Device (BYOD) has to be consistent with enterprise policies, and the liability in terms of compromised BYOD devices has to be reduced. Further, the user's private data, private policies, and users' reluctance in modifying its own device or limiting its capabilities have to be taken into account when applying the Bring Your Own Device realm.

Within these boundaries, applications have to be correctly executed on the employees' device, i. e. the untrusted environment.

Conventional solutions for a correct execution of applications, for example, disclosed in Mathias Payer, Tobias Hartmann, and Thomas R. Gross, "Safe Loading—A Foundation for Secure Execution of Untrusted Programs", in Proceedings of S&P 2012, or in Jonathan Pincus, Brandon Baker, Beyond Stack Smashing: "Recent Advances in Exploiting Buffer Overruns", IEEE Security and Privacy, 2004, rely on instruction set randomization.

Other conventional methods rely on a set of complementary hardware assumptions to achieve correct executions of applications. Conventional solutions also require a complete sandboxing of applications or leverage memory isolation in addition to address space randomization and are therefore time-consuming and complex to implement.

Another conventional solution disclosed in US 20120159193 A1 uses randomization of values of machine instruction code sets of an application prior to execution of the code.

SUMMARY

In an embodiment, the present invention provides a method and a system for executing applications on an untrusted device. The method includes selecting one or more applications as sensitive applications. One or more instruction sequences of the said one or more sensitive applications are modified by an external dongle. The one or more sensitive applications are executed on the untrusted device according to the modified instruction sequences. Whether correct execution of the instructions of the said modified instruction sequences has occurred is checked by the external dongle.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a method and a system for executing applications on an untrusted device being easy to implement and flexible.

In an embodiment, the present invention further provides a method and a system for executing applications on an untrusted device increasing the assurance in the correctness of the executing applications.

In an embodiment, the present invention even further provides a method and a system for executing applications on an untrusted device without requiring changes to a kernel or operating system hosted on the untrusted device which executes applications.

In an embodiment, the present invention even further provides a method and a system for executing applications on an untrusted device which do not penalize the performance of other applications that are also executed on an untrusted device.

According to an embodiment, a method for executing applications on an untrusted device is defined.

The method according to an embodiment includes the steps of
a) Selecting one or more applications as sensitive applications,
b) Modifying one or more instruction sequences of the said one or more sensitive applications by an external dongle,
c) Executing the one or more sensitive applications on the untrusted device according to the modified instruction sequences, and
d) Checking correct execution of the instructions of the said modified instruction sequences by the external dongle.

According to an embodiment, a system for executing applications on an untrusted device, includes
selection device operable to select one or more applications as sensitive applications, and
an external dongle operable to modify one or more instruction sequences of the said one or more sensitive applications and to check correct execution of the instructions, wherein
the untrusted device is operable to execute the one or more sensitive applications according to the modified instruction sequences.

The term "external dongle" refers in general to any trustable external device oper-able to communicate with the untrusted device. This trustable external device is preferably operable to execute trusted software and/or on-chip cryptographic algorithms.

The term "selecting" respectively "selection device" is to be understood in the broadest sense. Selection of an application may also be performed by simply using predefined parameters of an application, for example, if the application is termed a "banking application" or the like. Selection may also be performed directly by selecting an application as sensitive application by a user and/or indirectly, e.g. by copying an application to a special part of the memory used for sensitive applications and which can be understood as selection device.

In other words, according to an embodiment of the invention, before a sensitive application is launched the external dongle modifies the corresponding instruction sequence of the code of the sensitive application. At a separate bootstrapping stage the external dongle may be given the code or the set of instructions that are stored on the untrusted device pertaining to sensitive applications. The external dongle then may verify the sensitive application by means of a cryptographic signature and modifies the corresponding instructions and further preferably stores them back on the untrusted device. Whenever the sensitive application code is executed the untrusted device connects with the external dongle to check the results of executed instructions for their correct execution. If a result of an executed instruction is not matching with the expected result, the external dongle may determine an incorrect execution and stops execution on and communication with the untrusted device.

According to an embodiment of the invention, it has been recognized that the assurance for correct execution of applications is increased by instruction sequence modification with respect to executing code without modifying an underlying untrusted device, in particular an underlying kernel or operating system. Even in case an adversary controls the entire untrusted device on which applications are executed and can randomly insert instructions within the executions of applications and even further redirect an execution flow of a subset of the instructions in order to prevent them from being executed, the embodiments of the present invention provides a higher probability of detecting possible misbehavior of executed applications.

According to an embodiment of the invention, it has been further recognized that flexibility is enhanced, since any operating system, kernel or device implementation may be used.

According to an embodiment of the invention, it has been further recognized that the execution of other applications installed on a device for execution being non-sensitive applications is not hindered.

Further features, advantages and preferred embodiments are described in the following.

According to a preferred embodiment, one or more next instructions of a modified instruction sequence are assigned for execution on the untrusted device. This enhances the security since the untrusted device knows only a limited number of modified instructions, in which sequence they are to be executed. To enhance the security even more, the untrusted device may when a first instruction has been executed contact the external dongle for providing the next instruction to be executed. This may be the instruction itself or a reference for this instruction, e.g. an address in the memory of the untrusted device, in which the instruction to be executed next is stored.

According to a further preferred embodiment, step d) is performed by transmitting results of executed instructions of a modified instruction sequence to the external dongle and the obtained results are checked by the external dongle based on the performed modifications on said instruction sequences. This provides a very secure and efficient checking of performed instructions, since the external dongle may use modification information used for the modification of the instruction sequences earlier to check their results when having been executed on the untrusted device.

According to a further preferred embodiment, the one or more instruction sequences are locally stored on the untrusted device. This saves memory and computational resources on the external dongle without compromising security.

According to a further preferred embodiment, upon executing a sensitive application, one or more containers, preferably a common container, are launched on the untrusted device for providing a secure communication of security information and/or sensitive application information between the untrusted device and the external dongle. This enables to provide an efficient way to exchange security information and/or application information for an application with the external dongle. Application information may be for example, the code of the application or the like. Security information may for example, be keys for a secure connection between the container on the untrusted device or the external dongle, etc. Further if only one application container is used to communicate with the external dongle communication between different containers is reduced and a reliable centralized communication for all sensitive applications is provided.

According to a further preferred embodiment, modifying instruction sequences according to step b) is performed by randomly mixing instructions of at least two instruction sequences of the sensitive applications and/or by inserting one or more auxiliary instructions into an instruction sequence. Randomly mixing instructions of at least two instruction sequences of two different sensitive applications provides a simple but effective amendment/modification of the instruction sequences so that any misbehavior by an adversary can be detected with a high probability. By inserting one or more auxiliary instructions additionally and/or alternatively the correctness of a code of an application being executed can be ensured with an even higher probability, in particular when inserted randomly.

According to a further preferred embodiment, randomization is performed by a permuting the instructions of the one or more instructions sequences with a predetermined pseudorandom permutation. Since addresses and instructions of an application are pseudo-randomly permuted and since an adversary can not guess the execution flow of each application, the adversary can either execute the entire instructions stored which costs time and computational efforts or would have to simply abide by the execution flow dictated by the external dongle therefore leading to an assurance increase with respect to the correctness of executing applications.

According to a further preferred embodiment, bogus instructions and/or ringers and/or pre-computed checks are used as auxiliary instructions. To check the results performed by the executed code of an application, ringers and/or pre-computed checks are used whereas bogus instructions like null operations (nop) are used to confuse a potential adversary.

According to a further preferred embodiment, the number of ringers inserted per sensitive application is based on an estimated adversary cheating probability and a lower bound for cheat detection. For example, by inserting X indistinguishable ringers per application, the probability of detecting possible misbehavior is given by $$DP=1-(1-P)^X$$

For example
for X=1 and P=1 the detection probability DP=1,
for X=3 and P=0.5 the detection probability DP is 0.875,
for X=5 and P=0.5 the detection probability is DP=0.96875 and for
X=10 and P=0.5, the detection probability is DP=0.999.

This enables to determine efficiently the number of ringers inserted based on an adversary cheating probability and necessary for a probability to detect this cheat.

According to a further preferred embodiment, step b) is performed by inserting one or more instruction distinguishers for modifying the one or more instruction sequences. Instruction distinguishers are only known to the external dongle itself and look indistinguishable in the eyes of an external eavesdropper. The instruction distinguishers can enable the external dongle to verify the authenticity of the instruction sequence, for example, by decoding information encoded in the instruction distinguishers.

According to a further preferred embodiment, the instruction distinguishers are generated based on a special storage, preferably a register, within the untrusted device preferably a mobile device. When for example, an instruction distinguisher is generated based on a register within a device for example, values of register X, Y, and Z encode bits 100100100000 given an encoding scheme, where 100100100000 is derived given a seed and a key of the external dongle. This enables an easy way to verify the authenticity of the instruction sequence by the external dongle by decoding the information in the specific use of the registers within the instruction sequence.

According to a further preferred embodiment, the instruction distinguishers are based on special values, preferably a keyed hash value of application information. For instance the dongle could insert q distinguisher values within the instruction sequence flow of application identification as follows: Value i is assigned the i-th iterative keyed hash of the application identification using the keyed pseudorandom permutation k for the application identification. This ensures the freshness of the instruction, i. e. that it has not been inserted by an adversary or attacker, and enables double checking of the results of the device, i. e. that the device is correctly performing the computations or executions of code.

According to a further preferred embodiment, only results of executed auxiliary instructions are checked. This enables a fast checking for correct execution of instructions with high reliability by the external dongle.

According to a further preferred embodiment, the one or more sensitive applications are stored in a special region of the memory of the untrusted device. This enables to divide the memory of the untrusted device into two main parts. One part stores non-sensitive applications and the other part stores the sensitive application codes. This enables a separation of sensitive and normal applications in an easy way enhancing security.

According to a further preferred embodiment, upon execution of a least one application, preferably a sensitive application, and/or on demand by the external dongle, the memory layout of the untrusted device is refreshed. This further enhances the detection of possible misbehavior by adversary, since an adversary has to deal with a new memory layout every time an application is executed complicating the identification of instructions within the memory.

According to a further preferred embodiment, instructions relating to sensitive information for the sensitive applications are executed on the external dongle. This further enhances the security, since for example, trusted software and on-chip cryptographic algorithms are performed outside the untrusted environment on the trusted entity, the external dongle. Sensitive information may for example, cryptographic keys, modification tables for modifying the instruction sequences or the like.

According to a further preferred embodiment, when a connection timeout of the connection between the external dongle and the untrusted device occurs, an alert notification is provided to a user of the untrusted device, preferably initiated by the external dongle. This considers the case that an adversary could try to intercept the communication between the containers in the external dongle in order to affect the execution flow of sensitive applications. For example, if the communication with the external dongle and the container is prevented by an adversary the dongle could detect this misbehavior using the timeout and alert the user accordingly.

According to a further preferred embodiment, instructions of sensitive applications are encrypted and upon execution are decrypted by the external dongle, preferably such that a first decrypted instruction or decrypted sequence of instructions provides decryption information and/or execution information for the next encrypted instruction or encrypted sequence of instructions to be decrypted and/or executed. When the instructions are encrypted and upon execution are decrypted security against an adversary is further increased. When a first decrypted instruction or instructions sequence provides decryption information and/or execution information for the next encrypted instruction or instruction sequence to be decrypted and/or executed the necessary communication between the external dongle and the application respectively the untrusted device is reduced while security against adversaries is even further enhanced. Such a "chaining" of instruction or sequences of instructions avoids frequent communication of the untrusted device with the external dongle, since the untrusted device itself may obtain the necessary information for the next instruction or next instruction sequence.

Figure 1:
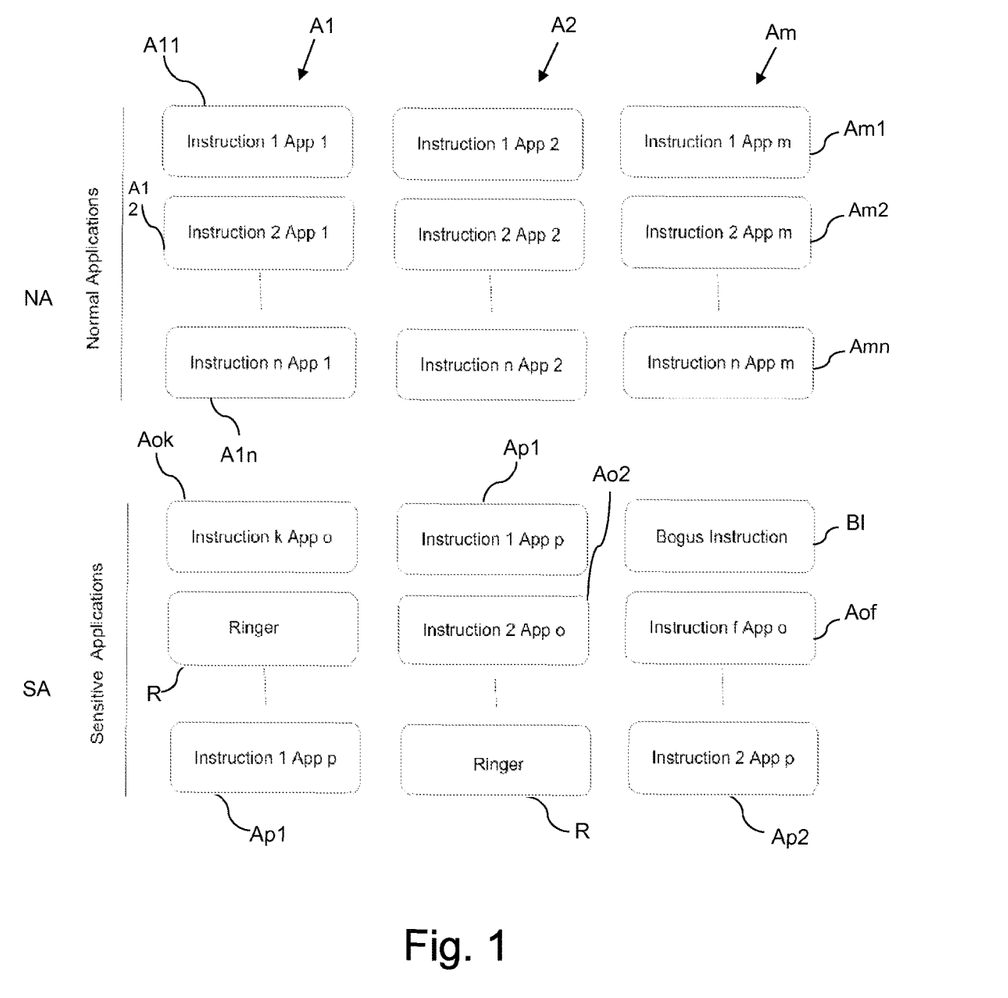
FIG. 1 shows a part of a method according to a first embodiment to the present invention.

FIG. 1 shows a part of a method according to a first embodiment to the present invention.

In FIG. 1, instruction sequences of normal applications NA and sensitive applications SA are shown. The normal applications NA with applications A1, A2, . . . , Am are performed normally, meaning that for each application A1, A2, . . . , Am the instructions are performed sequentially, i. e. for application A1 the instructions A11, A12, . . . , A1n are performed sequentially. The same applies for the other applications A2, . . . , Am.

In contrast thereto, for the sensitive applications SA, the instructions are randomized: For example, an instruction k of application o Aok is performed, then a ringer R is performed, after that, the first instruction 1 of an application p Ap1 is performed, and after that, a second instruction 2 of application o Ao2 is performed. Then after that, a ringer R is performed, then a bogus instruction BI, an instruction f of the application o Aof is performed, and after that, the second instruction 2 of application p Ap2 is performed, and so on.

For instruction randomization for sensitive applications SA, the external dongle ED permutes the instructions, for example, given a keyed pseudorandom permutation $K_f$. The external dongle ED includes also a number of auxiliary instructions R, BI, preferably randomly, for example, within the disk space of the underlying untrusted device. These auxiliary instructions refer to two types of instructions, namely bogus instructions BI, for example, null operations (nop) that are used to confuse an adversary and ringers R, or pre-computed checks that are used to check the work performed by the underlying device. These auxiliary instructions are indistinguishable to an adversary from genuine instructions of sensitive applications.

Alternatively or additionally, the external dongle ED may also insert randomly instruction distinguishers within each instruction that is only known to the external dongle ED itself and look in distinguishable in the eyes of an external eavesdropper. For example, the external dongle ED could generate a distinguisher through a specific use of some registers within the instructions: For example, the use of registers X, Y and Z encode bits 100100100000 given an encoding scheme, where 100100100000 is derived given a seed and a key of the external dongle ED. This enables the external dongle ED to verify the authenticity of the instructions set by decoding the information encoded in a specific use of the registers within the instructions.

Alternatively or additionally, by relying on obfuscation of binary code, the external dongle ED could probabilistically rely on inserting special values within the instructions. For instance, the external dongle ED could insert a number of distinguisher values within the instruction flow of an application identification ID as follows: The value i is the i-th iterative keyed hash of application identification using the key $K_{ID}$. This ensures freshness of the instruction, i.e. that is has not been inserted by an attacker, and allows a double-check of the work of the underlying untrusted device, i.e. that the untrusted device UD is correctly performing the computations or correctly executes the sensitive application.

Further in FIG. 1, it is shown that sensitive applications SA and normal applications NA are separated from each other. This means that the resulting memory of the underlying untrusted device UD is split into two main parts: The part that stores the non-sensitive, i. e. normal, applications NA on the untrusted device UD. This part of the memory of the untrusted device UD remains unchanged. The other part is for the sensitive applications SA, i.e. for storing the corresponding sensitive applications code. The association of addresses and instructions in this memory part of the sensitive applications SA is pseudorandomly permuted. Since an adversary cannot guess the execution flow of each application the adversary can either execute the entire instructions stored in the memory of the untrusted device, which costs time, computation and efforts or would have simply abide by the execution flow dictated by the external dongle ED. By reliance on fresh ringers R as instruction distinguishers the probability that an adversary executes additional instructions without being detected can be minimized. Upon executing each application, the external dongle ED refreshes the entire memory layout used for the sensitive applications SA enhancing the security against adversaries even further.

Figure 2:
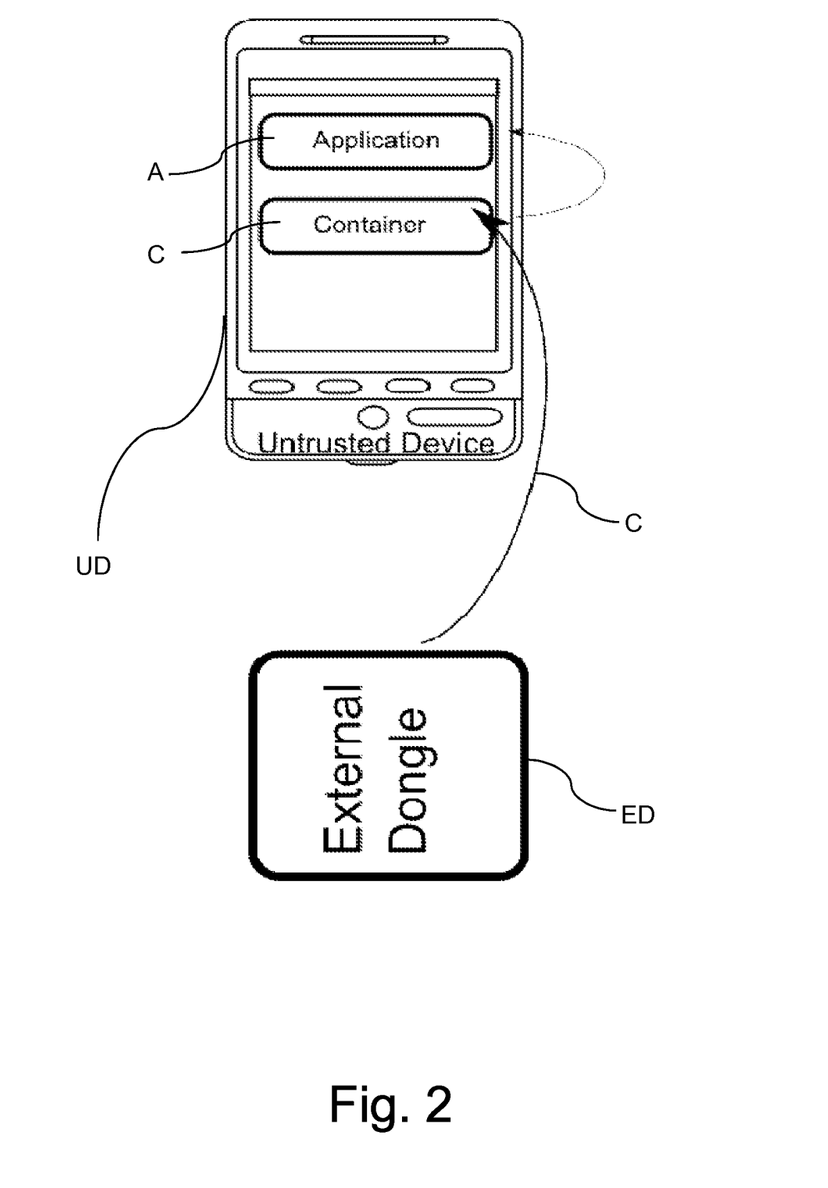
FIG. 2 shows a part of a system according to a second embodiment of the present invention.

FIG. 2 shows a part of a system according to a second embodiment of the present invention.

In FIG. 2, an external dongle ED randomizes an instruction code of an application A, which is stored in the memory of an untrusted device UD. The application A is launched by means of the container C. The container C is an installed application on the untrusted device UD for the purpose to launch sensitive applications SA and to communicate with the external dongle ED. The external dongle ED executes trusted software and on-chip cryptographic algorithms and connects to the untrusted device UD.

For example, at a separate bootstrapping stage, the external dongle ED is given the code respectively the set of instructions that are stored on the untrusted device UD, for example, on disk, pertaining to sensitive applications SA. The external dongle ED verifies the sensitive applications by means of a cryptographic signature, applies a randomization function to the corresponding instructions and stores them back on the untrusted device UD, preferably on disk. Whenever a code of the sensitive application SA is executed, the container C is launched first. The container C then communicates with the external dongle ED to acquire the next instruction to be executed, for example, from the disk from the untrusted device UD. Upon completion of each instruction, the container C fetches the next instruction to be executed from the external dongle ED.

The communication between the external dongle ED and the untrusted device UD respectively the container C is not restricted to a physical channel: The communication may also be provided via a wireless channel, for example, over the internet or through Bluetooth, WiMAX, W-LAN or the like.

Even further, sensitive information like cryptographic instructions, for example, those involving secret keys, encryption and cryptographic hashes are never stored in the untrusted device UD; they are stored and executed within the external dongle ED itself. The external dongle ED may thus keep track of the execution flow of a given sensitive application and through a data structure stored within the external dongle ED. For example, this includes the key used to perform the pseudorandom permutation of instructions, etc.

Figure 3:
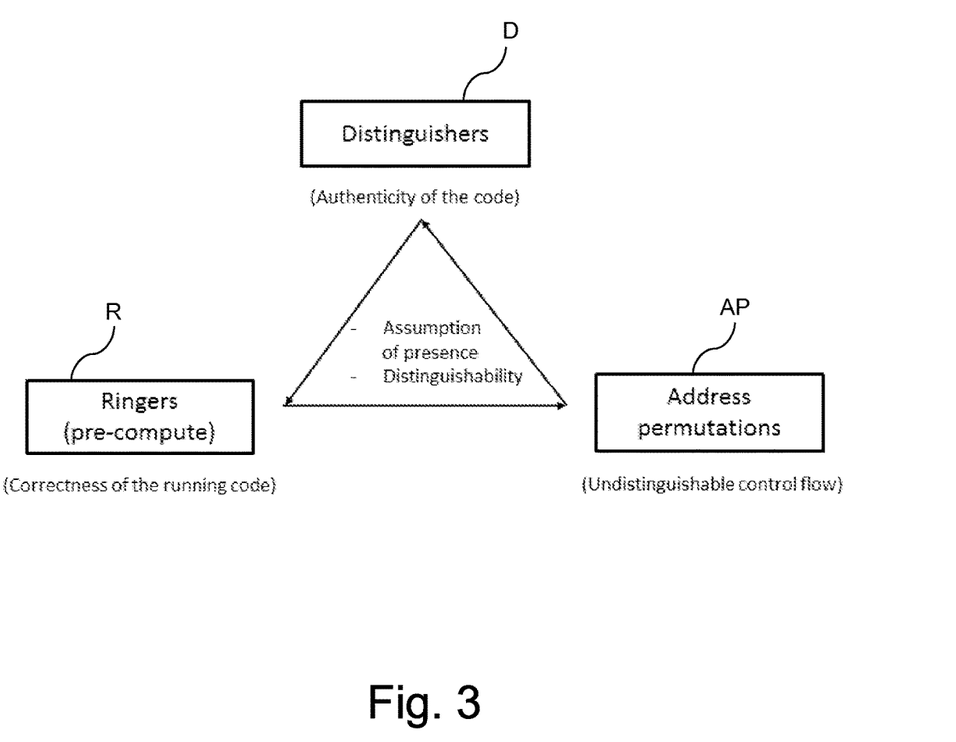
FIG. 3 shows a principal overview of steps of a method according to a third embodiment of the present invention.

FIG. 3 shows a principal overview of steps of a method according to a third embodiment of the present invention.

In FIG. 3, the main building blocks used according to an embodiment of the invention are shown.

On the one hand there are ringers R which are pre-computed ensuring the correctness of a running code. Address permutations AP provide on the other hand an undistinguishable control flow, and distinguishers D allow a verification of the authenticity of a code.

Even further, conventional obfuscation techniques can be used to further harm the possibility that an adversary can correctly decompile each specific set of instructions.

In summary the present invention allows combining the use of an external untrusted device with instruction set randomization to increase the assurance with respect to executing code without modifying the underlying kernel. The present invention further enables embedded keyed checks within the code to achieve instruction origin authentication and to prevent possible instruction injection with the code by an adversary. Even further, the present invention combines the use of pre-computed checks with instruction set randomization to prevent an adversary from modifying the executing application.

The present invention increases the assurance with respect to the correctness of the executing applications within an untrusted device without requiring modifications to untrusted device itself. The present invention does not hinder/penalize the execution of other applications installed on the untrusted device and which are not determined as sensitive application. Even further, the present invention does not require any additional hardware support but leverages the limited computation power available to an adversary to increase the assurance in the correctness of executing applications. Even further, the present invention is very flexible and is not restricted to any specific operating system, kernel or mobile device implementation.

The present invention enables to securely monitor the execution within applications, to probabilistically attest the correctness of the executing applications and to prevent an adversary from injecting new instructions within the execution code of applications without penalizing the performance of other commodity applications that are also being executed on the untrusted device.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for executing applications on an untrusted device, comprising:
   selecting one or more applications as sensitive applications,
   modifying, by an external dongle, one or more instruction sequences of the one or more sensitive applications by randomly mixing instructions of at least two of the instruction sequences of the sensitive applications, wherein the randomly mixing includes permuting the instructions of the one or more instruction sequences with a predetermined pseudorandom permutation,
   executing the one or more sensitive applications on the untrusted device according to the modified instruction sequences, and
   checking, by the external dongle, correct execution of instructions of the modified instruction sequences by transmitting results of executed instructions of one of the modified instruction sequences to the external dongle and checking, by the external dongle, the transmitted results based on the modifications performed on the one or more instruction sequences.

2. The method according to claim 1, wherein one or more next instructions of one of the modified instruction sequences are assigned for execution on the untrusted device by the external dongle.

3. The method according to claim 1, wherein the modified instruction sequences are locally stored on the untrusted device.

4. The method according to claim 1, wherein, upon executing one of the sensitive applications, one or more containers are launched on the untrusted device for providing at least one of a secure communication of security information or sensitive application information between the untrusted device and the external dongle.

5. The method according to claim 1, wherein the one or more instruction sequences are further modified by inserting one or more instruction distinguishers.

6. The method according to claim 5, wherein the one or more instruction distinguishers are generated based on a predetermined storage within the untrusted device.

7. The method according to claim 5, wherein the one or more instruction distinguishers are based on keyed hash values of application information.

8. The method according to claim 1, wherein the one or more sensitive applications are stored in a predetermined region of memory of the untrusted device.

9. The method according to claim 1, wherein, upon execution of at least one of the one or more sensitive applications, or on demand by the external dongle, a memory layout of the untrusted device is refreshed.

10. The method according to claim 1, wherein instructions relating to sensitive information for the one or more sensitive applications are executed on the external dongle.

11. The method according to claim 1, further comprising initiating, by the external dongle, an alert notification based on a connection timeout of a connection between the external dongle and the untrusted device, and providing the alert notification to a user of the untrusted device.

12. The method according to claim 1, further comprising encrypting the one or more instruction sequences of the one or more sensitive applications, and upon execution, decrypting, by the external dongle, encrypted instruction sequences, such that a first decrypted instruction or a decrypted sequence of the one or more instruction sequences provides at least one of decryption information or execution information for a next encrypted instruction or encrypted instruction sequence to be at least one of decrypted or executed.

13. A system fix executing applications on an untrusted device, comprising:
   a selection device configured to select one or more applications as sensitive applications, and
   an external dongle configured to modify one or more instruction sequences of the one or more sensitive applications and to check correct execution of instructions by receiving results of executed instructions of one of the modified instruction sequences from the trusted device and checking the results based on the modifications performed on the one or more instruction sequences, wherein the one or more instruction sequences are modified by randomly mixing instructions of at least two of the instruction sequences of the sensitive applications, wherein the randomly mixing includes permuting the instructions of the one or more instruction sequences with a predetermined pseudorandom permutation, and wherein the untrusted device is operable to execute the one or more sensitive applications according to the modified instruction sequences.

14. A method for executing applications on an untrusted device, comprising:
   selecting one or more applications as sensitive applications,
   modifying, by an external dongle, one or more instruction sequences of the one or more sensitive applications by inserting one or more auxiliary instructions into one of the instruction sequences, wherein at least ringers are used as the one or more auxiliary instructions, wherein a number of ringers inserted in each of the sensitive applications is based on an estimated adversary cheating probability and a lower bound for cheat detection,
   executing the one or more sensitive applications on the untrusted device according to the modified instruction sequences, and
   checking, by the external dongle, correct execution of instructions of the modified instruction sequences by transmitting results of executed instructions of one of the modified instruction sequences to the external dongle and checking, by the external dongle, the transmitted results based on the modifications performed on the one or more instruction sequences.

15. The method according to claim 14, wherein the one or more instruction sequences are modified by inserting one or more instruction distinguishers.

16. The method according to claim 15, wherein the one or more instruction distinguishers are generated based on a predetermined storage within the untrusted device.

17. The method according to claim 15, wherein the one or more instruction distinguishers are based on keyed hash values of application information.

18. The method according to claim 14, wherein the checking is performed only on the one or more auxiliary instructions.

* * * * *